US008296668B1

(12) United States Patent
Song et al.

(10) Patent No.: US 8,296,668 B1
(45) Date of Patent: Oct. 23, 2012

(54) PAPER TEXTURE FOR WATERCOLOR PAINTING EFFECTS IN A GRAPHICS EDITING PROGRAM

(75) Inventors: Yuyan Song, West Lafayette, IN (US); Peter F. Falco, Jr., Saratoga, CA (US)

(73) Assignee: Adobe Systems Incorporated, San Jose, CA (US)

( * ) Notice: Subject to any disclaimer, the term of this patent is extended or adjusted under 35 U.S.C. 154(b) by 468 days.

(21) Appl. No.: 12/367,357

(22) Filed: Feb. 6, 2009

Related U.S. Application Data

(60) Provisional application No. 61/089,396, filed on Aug. 15, 2008.

(51) Int. Cl.
*G06F 3/048* (2006.01)
*G09G 5/00* (2006.01)
(52) U.S. Cl. ......... 715/764; 345/581; 345/582; 345/586
(58) Field of Classification Search .................. 715/784, 715/764; 345/571, 582, 586
See application file for complete search history.

(56) References Cited

U.S. PATENT DOCUMENTS

| 5,384,899 | A | * | 1/1995 | Amit ............................... 345/581 |
| 5,432,896 | A | | 7/1995 | Hwong et al. |
| 5,784,301 | A | * | 7/1998 | Guo et al. ....................... 345/582 |
| 6,198,489 | B1 | | 3/2001 | Salesin et al. |
| 6,919,893 | B2 | * | 7/2005 | Tobita et al. ................... 345/473 |
| 8,018,470 | B2 | * | 9/2011 | Hsu ................................ 345/581 |
| 2009/0157366 | A1 | * | 6/2009 | Shin et al. ......................... 703/9 |

OTHER PUBLICATIONS

Nelson Chu & Chiew-Lan Tai, "MoXi: Real-Time Ink Simulation—Next-Generation Digital Painitng Technology," Sep. 20, 2007, retrieved from http://visgraph.cse.ust.hk/MoXi/.*

John Derry, "A Visual Guide to Corel Painter 7 Water Color," Apr. 13, 2001, obtained from http://www.pixelalley.com/, pp. 1-26.*
Jessica Stacy Scott, "GPU Programming for Real-Time Watercolor Simulation," Dec. 2004, A Thesis submitted to the Office of Graduate Studies of Texas A&M University.*
Nelson S.-H. Chu and Chiew-Lan Tai," MoXi: Real-Time Ink Dispersion in Absorbent Paper," ACM Transactions on Graphics (TOG), vol. 24 , Issue 3 (Jul. 2005), Proceedings of ACM SIGGRAPH 2005, pp. 504-511.
Wei Li, Zhe Fan, Xiaoming Wei, and Arie Kaufman, "GPU-Based Flow Simulation with Complex Boundaries," GPU Gems II, Chapter 47, edited by Matt Pharr (NVIDIA) and published by Addison Wesley.
Van Laerhoven, Tom, et al., "Real-time watercolor painting on a distributed paper model," Jun. 2004, IEEE Computer SOC Computer Graphics International, Proceedings. p. 640-643.

* cited by examiner

*Primary Examiner* — Weilun Lo
*Assistant Examiner* — Dino Kujundzic
(74) *Attorney, Agent, or Firm* — Robert C. Kowert; Meyertons, Hood, Kivlin, Kowert & Goetzel, P.C.

(57) ABSTRACT

Systems and methods for simulating watercolor painting effects in a graphics application may employ an ink dispersion model comprising three layers: surface, flow, and fixture. In response to input representing deposition of ink on paper having a given paper texture, a blocking parameter may be determined dependent on three texture channels of the given paper texture: paper grain, pinning, and absorption. The absorption channel may control absorption behavior of the paper. A noise texture applied onto the absorption channel may simulate uneven absorption across the paper. A lattice Boltzmann based simulation may model the dispersion of ink in the flow layer, and may be dependent on the blocking parameter, and on values of parameters for controlling ink and brush properties. The ink, brush, and paper texture parameter values may be user-configurable through a graphical user interface of the graphics application. An output image may be composited from the three layers.

34 Claims, 11 Drawing Sheets

A. Data packing for textures

A.1 Layers

<R, G, B, pigment concentration> for surface and flow layers

<R, G, B, alpha> for fixture layer

A.2 Bins

<DL, UL, UR, DR> for diagonal bins texture

<L, U, R, D> for horizontal-vertical bins texture

<b0, total water, ux, uy> for the stational bins texture

A.3 Water tracking texture

<surface water, flow water, unused, blocking parameter>

A.3 Paper texture

<partial blocking, pinning, absorption, unused>

FIG. 11

PAPER TEXTURE FOR WATERCOLOR PAINTING EFFECTS IN A GRAPHICS EDITING PROGRAM

PRIORITY INFORMATION

This application claims benefit of priority of U.S. Provisional Application Ser. No. 61/089,396 entitled "Paper Texture for Watercolor Painting Effects in a Graphics Editing Program" filed Aug. 15, 2008, the content of which is incorporated by reference herein in its entirety.

BACKGROUND

Description of the Related Art

Being able to simulate painting effects within a graphics editing program is a desired feature for artists. Various methods for computationally simulating painting effects have been developed. For example, techniques for simulating Eastern brushwork are described in Nelson S.-H. Chu and Chiew-Lan Tai, "MoXi: Real-Time Ink Dispersion in Absorbent Paper," ACM Transactions on Graphics (TOG), Volume 24, Issue 3 (July 2005), Proceedings of ACM SIGGRAPH 2005, Pages: 504-511, which is hereby incorporated by reference in its entirety. Chu et at describes various effects of ink dispersion and shows how to simulate them computationally so that artists can "paint" in the spontaneous style of Eastern ink painting on a computer interactively.

In Eastern ink painting, artists utilize flexible brushes to create expressive lines and shapes, and exploit the interplay of ink and water to produce shades and patterns. Chu et al describes techniques for modeling various effects of Eastern brushwork, including:

- Feathery pattern: When diluted ink is absorbed into the paper, delicate ink streaks follow the direction of the water flow appear as the pigment is hindered or used up while the ink spreads.
- Light fringes: When a stroke is made with diluted ink, water percolates on paper forming a light fringe around the stroke. If another stroke is painted over the first, the wet region of the paper is less receptive to the new stroke, making the light fringes stand out.
- Branching pattern: Branching patterns appear when the water flow is obstructed by irregularities in the paper or trapped ink ingredients. Artists may apply glue or other materials unevenly onto the paper to enhance this effect.
- Boundary roughening: As ink percolates through paper, the wet-dry boundary is pinned at different points by the irregularities in the paper. This is more prominent with concentrated ink, forming toes around the boundary.
- Boundary darkening: At the pinned boundary of a wet ink mark, water is lost to the surrounding dry fibers via capillary attraction. This water evaporates immediately without expanding the mark, and the attraction induces a migration of pigments that darkens the boundary.

As described in Chu et al, previous work in Eastern ink simulation first included modeling ink spreading as a one-dimensional filtering process, and later used partial differential equations (PDE) in an attempt to better describe the phenomenon. Other research efforts included cellular automation for simulating ink dispersion, or methods for processing the fronts of spreading strokes to speed up rendering. Various techniques for simulating Western watercolor simulation are also described in Chu et al. One such technique simulates the flow of water in two parts (on the paper surface, and through the paper fibers), solves the Navier-Stokes (N-S) equations for the on-surface flow, and uses a cellular automation for the capillary flow through fibers to produce an effect called back-run. However, this technique does not simulate Eastern ink effects well. Some watercolor simulations are performed on a grid of processing units, e.g., using a semi-LaGrangian method for faster simulation. In addition, graphics researchers have adopted numerical fluid simulation to add realism to computer generated animations

SUMMARY

Systems and methods for simulating watercolor painting effects in a graphics application may employ an ink dispersion model comprising three layers: a surface layer, a flow layer, and a fixture layer. The surface layer may serve as an ink reservoir in the simulation. In various embodiments, the graphics application may provide a user interface mechanism (e.g., a brush tool) that may be employed by a user to represent the deposition of ink on paper having a given paper texture, such as in watercolor painting. Parameters for controlling ink and brush properties (e.g., hue, intensity, pigment concentration, water concentration, etc.) may be user-configurable through a graphical user interface of the graphics application, in some embodiments.

In response to an input via the brush tool, the graphics application may determine a blocking parameter dependent on three texture channels of the given paper texture: paper grain, pinning, and absorption. In some embodiments, the paper texture parameter values may be user-configurable through a graphical user interface of the graphics application. The absorption channel may control absorption behavior of the paper. In some embodiments, a noise texture applied onto the absorption channel may simulate uneven absorption behavior across the paper.

In various embodiments, a lattice Bolztmann based simulation may model the dispersion of ink in the flow layer, and may include simulation of a stable flow step, a steaming action, and a collision action. The simulation may be dependent on the blocking parameter, and/or on the values of various parameters controlling ink and brush properties.

The method may include simulation of an advection operation, which may be dependent on the value of a configurable pigment concentration parameter for the ink. The method may also include simulation of evaporation of water, which may be dependent on the value of a configurable water concentration parameter for the ink and/or the absorption channel of the paper.

Following the simulation operations described herein, the corresponding pigment amount(s) may be deposited on the fixture layer, according to the results of the simulation operations. An output image may be composited from the three layers, e.g., using a front-to-back layer composition, in some embodiments. In various embodiments, the output image may be displayed for the user, printed, and/or stored for later processing by the graphics application or another application.

The methods described herein may in some embodiments be provided as a module of a graphics application, such as a graphics editing module supporting simulation of watercolor painting effects. The graphics editing module may be implemented by program instructions stored on a computer readable medium and executable by one or more processors (e.g., one or more CPUs and/or GPUs) to cause the processor(s) to perform the functionality described herein.

BRIEF DESCRIPTION OF THE DRAWINGS

FIG. 11 illustrates data packing of texture information, according to one embodiment.

Figure 1:
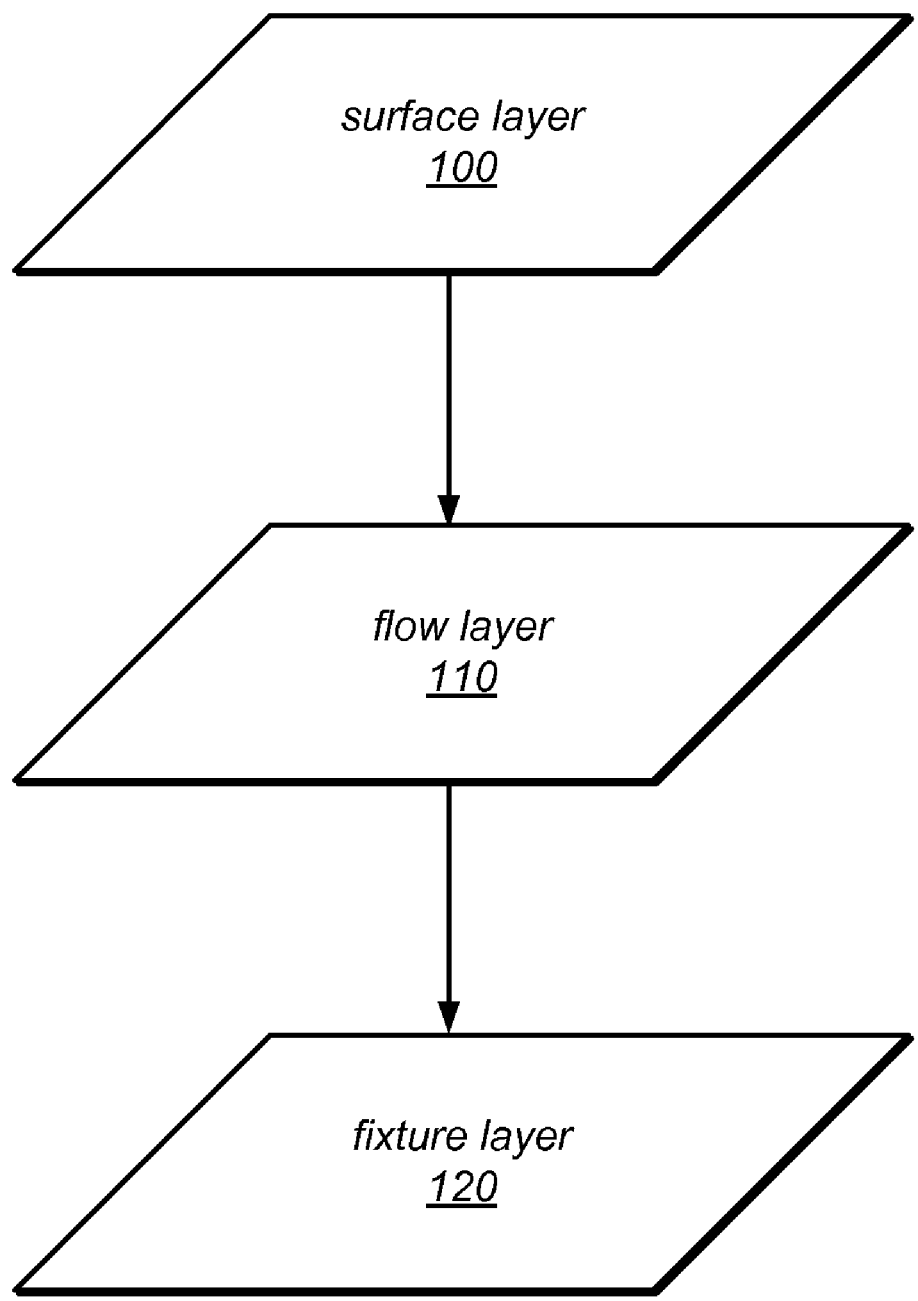
FIG. 1 illustrates a three layer ink flow model, according to one embodiment.

While several embodiments and illustrative drawings are included herein, those skilled in the art will recognize that embodiments are not limited to the embodiments or drawings described. It should be understood, that the drawings and detailed description thereto are not intended to limit embodiments to the particular forms disclosed, but on the contrary, the intention is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follows are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

The ability to simulate painting effects within a graphics editing program (e.g., Adobe Photoshop®, etc.) is a desired feature for artists. In some embodiments, watercolor painting simulations may be created in a graphics editing program by incorporating stable fluid dynamics simulation methods into the graphics editing program's framework. The graphics editing program may provide a user interface that allows users to select one of a plurality of brushes in a brush tool and apply the selected brush directly onto a user-specified paper texture effect to achieve various watercolor painting effects in real-time.

In some embodiments, the watercolor painting simulations provided by the graphics editing program may employ one or more ink dispersion algorithms. In some embodiments, an ink dispersion algorithm such as that described in Chu et al, or an enhanced variation thereof may be employed. In one embodiment, the three layer ink dispersion in absorbent paper model described in Chu et al may be employed with some modifications. In some embodiments, various simulations parameters for the algorithm, such as the simulation parameters described in Chu et al, may be eliminated or hard-coded in the graphics editing program. In other embodiments, the graphics editing program may expose some configurable parameters to users for a given simulation, such as some of the parameters discussed below. The graphics editing program may provide a user interface for the user to be able to select or adjust such parameters.

As described in Chu et al, one approach for fluid simulation (e.g., ink flow simulation) is a method based on the lattice Boltzmann equation (LBE). Instead of starting with a macroscopic description of the fluid, the LBE models the physics of fluid particles at a mesoscopic level. The ink flow simulation of Chu et al is based on a paper model that includes three layers: surface, flow and fixture. In this model, ink is first deposited onto the surface layer, and it is assumed that the ink flows only in the flow layer and not in the surface layer. In this model, the ink on the surface gradually seeps into the flow layer, where water percolates through paper and ink constituents are advected by the water. Finally, as the ink dries, ink constituents in the flow layer are moved slowly into the fixture layer. Chu et al describes the use of an LBE-based fluid flow model to simulate the water percolation, and describes a coupling of this flow model with a method for simulating the movement of ink constituents. Chu et al also describes that the quantity fields used in the ink flow simulation (e.g. water velocity) are discretized spatially on a lattice in the LBE method. These data fields are updated iteratively using a GPU, while a CPU is dedicated to brush simulation. The discretized data fields are stored as texture maps. In the description of these and similar methods below, the spatial indices to data fields (e.g., p) are omitted in references to the quantity at the current lattice site, as in a data streaming model.

In one embodiment, a graphics editing program may employ a modified version of the three layer model described in Chu et al to create various watercolor painting effects. In some embodiments, the various watercolor painting effects may be created in real-time, e.g., responsive to user input (such as a brush tool of a graphical user interface) to show the effect as the user moves the tool within the interface. As in Chu et al, the three layer model may include a surface layer, a flow layer, and a fixture layer. The surface layer may serve as an ink reservoir so that the water flow simulation is kept under a stable status. The flow layer may be the image layer on which the water flow simulation takes place. The fixture layer may be the image layer where the dried pigment is deposited. FIG. 1 is an illustration of the three layers of the model, according to one embodiment. In this example, the arrows illustrate the ink transportation direction from layer to layer. In some embodiments, a graphics editing program employing such a three layer model to support simulation of watercolor painting effects may employ front-to-back alpha blending to blend the surface, flow and fixture layers to generate a final image.

Figure 2:
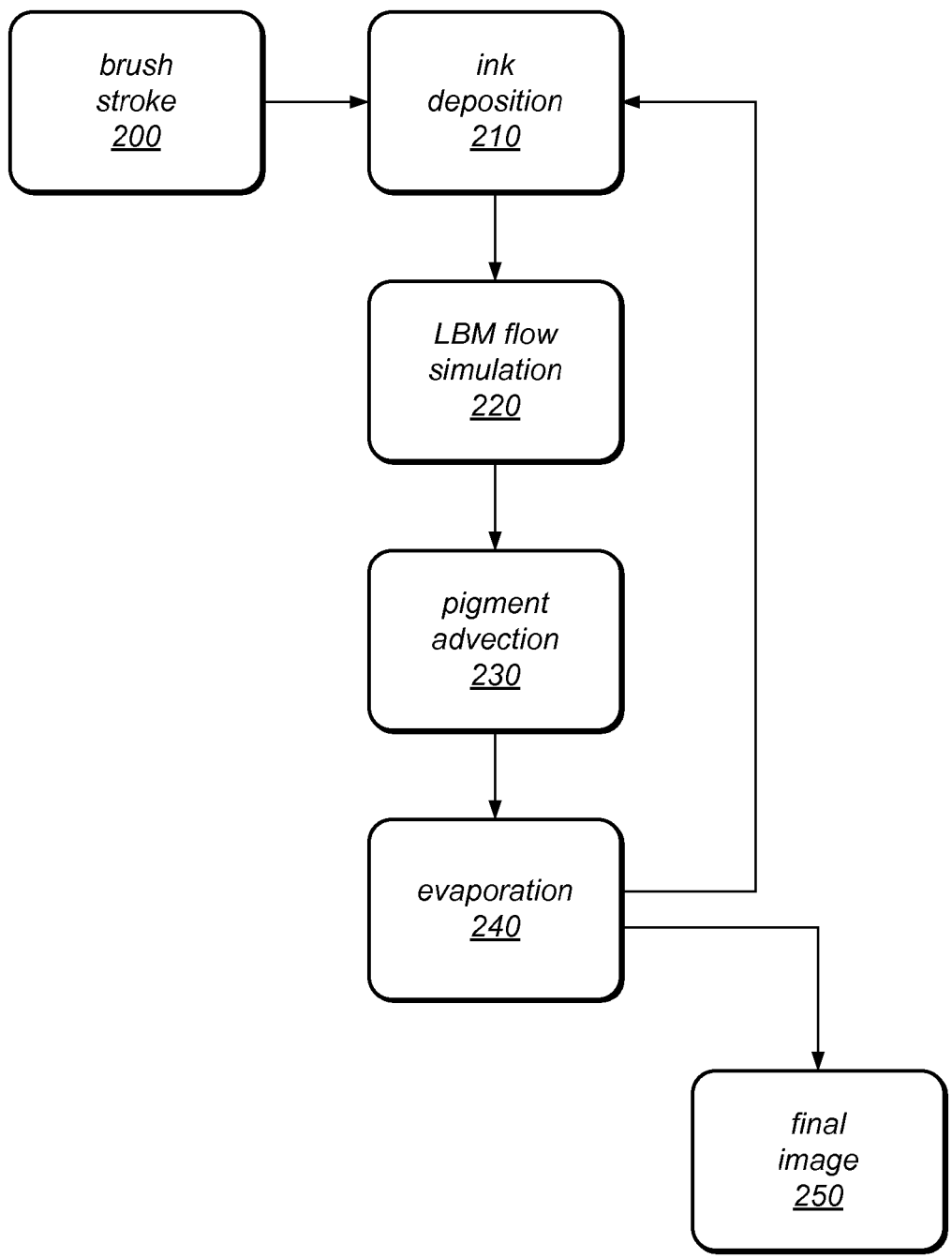
FIG. 2 illustrates a simulation pipeline for watercolor painting effects, according to one embodiment.

FIG. 2 illustrates a simulation pipeline for a watercolor painting simulation provided by a graphics editing program, according to one embodiment. In this example, a brush stroke operation 200 (e.g., input via a graphical user interface) may invoke the mixing of brush ink with ink that is still on the surface layer (e.g., surface layer 100 of FIG. 1). In one embodiment, the simulation sequence may include an ink deposition operation 210, followed by a computational fluid dynamics simulation 220 (such as a lattice Boltzmann method (LBM) simulation), followed by pigment advection operation 230, and then an evaporation operation 240. As illustrated by the feedback loop from 240 to 210 in FIG. 2, this sequence may be performed for each simulation step. In some embodiments, the ink deposition operation 210 serves to transfer ink (e.g., as selected via the user interface) from the surface layer 100 to the flow layer 110. In one embodiment, LBM simulation 220 may then be performed to simulate the stable flow so that the density distributions and velocities of all the lattice sites for the next iteration may be computed. The LBM simulation is explained in more detail below. Based on the computed density distributions and velocities, a new flow layer 110 may be evaluated as part of pigment advection operation 230. The evaporation operation 240 may serve to determine the amount of ink that will evaporate in a given iteration and the amount of pigment that is to be deposited into the fixture layer 120. Current surface, flow and fixture layers may then be composited to generate a final image 250 for output (e.g., to a display, for printing, and/or to be stored for further processing).

Figure 3:
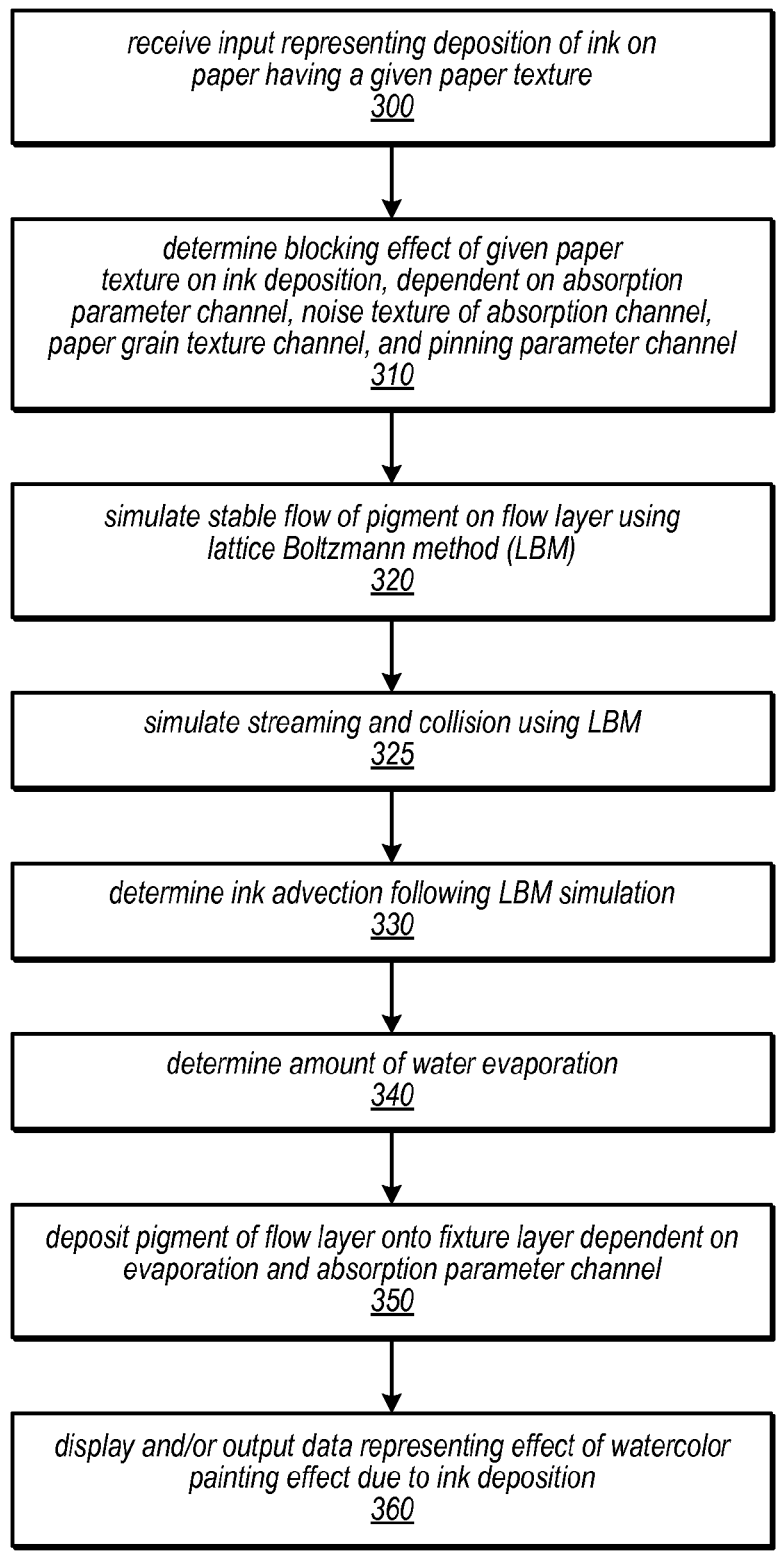
FIG. 3 illustrates a method for simulating watercolor painting effects, according to one embodiment.

One embodiment of a method for simulating watercolor painting effects using paper texture is illustrated in FIG. 3, as in 300. In this example, a graphics application, such as a graphics editing application, receives an input representing the deposition of ink on a piece of paper having a particular paper texture. For example, a user may provide the input using a brush tool of a graphical user interface (GUI) of the graphics application. The user may employ the brush tool to represent the stroke of a paintbrush across the paper as the user moves a cursor (e.g., using a mouse, touch pad, keyboard, track ball, etc.) across an image representing the paper. In some embodiments, the GUI may also provide the user with a mechanism for specifying the hue and/or intensity of the pigment of the simulated ink, the amount and/or concentration of pigment to be deposited in the simulation, and the amount and/or concentration of water to be simulated along with the pigment (e.g., representing the dilution of the pigment in the ink before its application to the paper). For example, in some embodiments, the GUI may include slider bars, pop-up menus, pull-down menus, dials, text entry boxes, or other mechanisms for specifying values or relative values of these and other configurable parameters.

As described herein, paper texture may be characterized using a variety of paper texture parameter channels. In this example, the paper texture may include an absorption parameter channel, a paper grain texture channel, and a pinning parameter channel, all of which are described in more detail below. As shown in 310 of FIG. 3, the method may include determining a blocking effect of the paper texture on the ink deposition, based on the values of these parameters. In some embodiments, a noise texture may be applied to the absorption parameter channel to reflect the fact that absorption is not uniform across the paper.

In the example illustrated in FIG. 3, the method includes simulating the stable flow of the pigment on the flow layer using the lattice Boltzmann method, as in 320. In this example, the next iteration of the flow simulation includes the simulation of two steps (streaming and collision), as in 325. The LBM simulation is described in more detail below.

Following the LBM simulation, ink advection is determined, as in 330. As described in more detail herein, in some embodiments, ink advection may be dependent on the concentration of pigment according to the value of a configurable parameter, as specified by the user or as programmatically determined. In this example, the method includes determining the amount of water evaporation that takes places following the deposition of the ink, as in 340. In various embodiments, this determination may be dependent on the value of a configurable water concentration parameter and/or on the absorption parameter channel of the paper texture. In the example illustrated in FIG. 3, after taking into account the flow simulation, ink advection, and evaporation operations, the corresponding pigment on the flow layer is deposited on the fixture layer, as in 350. In this example, the deposition of the pigment on the fixture layer is also dependent on the absorption parameter channel of the paper, as described in more detail below.

In the example illustrated in FIG. 3, the method includes displaying and/or outputting data representing the result of the watercolor painting effect, as determined by the simulation operations described above. This is shown as 360. For example, in some embodiments, an image representing the deposition of ink on the paper may be displayed to the user in response to executing the simulation operations described above, and/or may be printed by the user. In other embodiments, data representing the resulting watercolor painting effect may be stored in one or more data structures for further processing by the graphics application or by another application.

As described in Chu et al, the actual process of ink dispersion is a complex interplay between paper, water and ink constituents. Chu et al describes ink dispersion as a two-part process: the percolation of water and the movement of pigments within the water. Using the three layer model, the amount of ink deposited onto the surface layer may be determined by the brush footprint and the saturation of water in the brush and in the paper. In this model, ink is supplied from the surface to the flow layer, and the surface layer, which acts as a reservoir, stores excess ink not yet absorbed.

Various models may be used to generate brush footprints, including those described in Chu et al. These models may be used to determine the amount of water supplied from the surface to the flow layer φ, based on various paper texture parameters, and parameters of the ink. In various embodiments, φ may be calculated based on ρ, which represents the water density (amount of water) at the corresponding lattice site in the flow layer; s, which denotes the amount of water on the surface; and the values of various ink parameters and/or paper texture parameters according to various algorithms, such as those described in Chu et al, or those described herein. After φ is determined, s and ρ may be updated accordingly.

In various embodiments, brush ink is blended with the ink on the surface layer at the brush stroke stage shown in FIG. 2. In one embodiment, the blending equation for this step is:

$$Col = \frac{(C_{brush} \cdot \text{Water}_{brush} \cdot PC_{brush} + C_{surface} \cdot \text{Water}_{surface} \cdot PC_{surface})}{\text{Water}_{brush} \cdot PC_{brush} + \text{Water}_{surface} \cdot PC_{surface}} \quad (1)$$

In the above equation, Water is the amount of water for the brush or for the current layer, and PC is pigment concentration for the brush or for the current layer. The product of Water·PC is the amount of pigment. In some embodiments, users are able to control the ink amount and pigment concentration through sliders or other controls of the user interface of the graphics editing program. The water amount and pigment concentration are tracked through the simulation and they are also used in later stages for viscosity control and color layer generation.

As described in Chu et al, variable permeability in the model may allow the creation of interesting flow patterns. The permeability may be realized by blocking the streaming process; thus each site may be associated with a blocking factor κ. Varying κ may allow the system to model a wide range of media, from those that allow no water movement to those where perturbation in ρ causes ripples. In some embodiments, a half-way-bounce-back scheme may be used during the streaming process to simulate variable permeability, as described in Chu et al. The streaming step with bounce-back (partial blocking) may be mathematically described as shown in equation (2) below.

After the ink has been deposited onto the surface layer, blocking parameters may be updated based on the ink amount of the sites and the paper texture. In various embodiments, different paper texture channel usages may be defined. A specific texture channel (the paper absorption channel) may be defined for watercolor painting effects and may be used to create a variety of different effects. This channel may be used to control the absorption behavior of the paper (e.g., the paper or canvas type selected via the user interface of the graphics editing program, which may provide for selection between various paper/canvas types). In some embodiments, a noise texture may be applied onto the absorption channel to simulate the uneven absorption behavior of real paper.

In one embodiment, only three data channels are used for the simulation computation, as opposed to four channels in the work of Chu et al. In such embodiments, the R channel for the paper texture, which is the paper grain texture, may be used to update the $k_i$ parameter to partially block the streaming for simulation of ink viscosity.

Figure 4:
FIG. 4 illustrates a graphical image containing watercolor painting effects, according to one embodiment.
Figure 9:
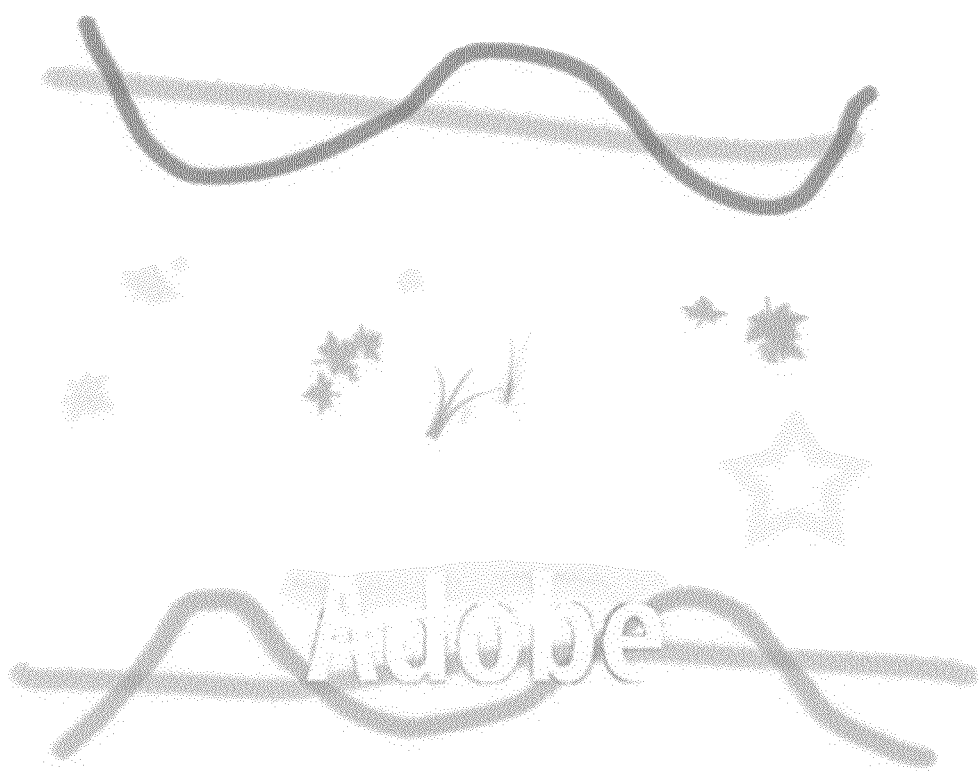

In one embodiment, the partial blocking may be achieved using:

$$f_i(x, t+1) = \overline{\kappa_i}(x) f_\kappa(x,t) + (1-\overline{\kappa_i}(x)) f_i(x-e_i,t) \quad (2)$$

where $f_k$ is the distribution function pointing in the opposite direction of $f_i$. In some embodiments, the pinning parameter, which may be used for the control of ink flow directions, is obtained through the G channel of the paper texture. The blocking parameters for pinning sites may be overwritten with very high values to fully block the streaming. In some embodiments, the B channel may be used to control the absorption rate of the paper. This absorption channel may be used to simulate the absorption behavior of paper. One example of a use of the absorption channel may be to create a wax painting mask. FIG. 4 illustrates an image generated with a wax painting mask specified by modifying the absorption channel for the paper texture. In this example, by setting the absorption of the 2008 Beijing Olympic Games logo regions to 0, a wax painting mask effect is created for the texture layer. When the canvas or paper is painted, the ink flows past the wax region and is absorbed in regions where there is no mask (e.g., where the absorption channel values are greater than zero). Thus, in some embodiments, the absorption channel may be used to control where and/or how "fast" ink is absorbed. Another example of the use of the absorption channel for creating a wax painting mask is illustrated in FIG. 9 and discussed below.

As noted in Chu et al, another factor that may affect ink flow is viscosity. For example, in actual watercolor painting, artists sometimes add extra glue to the ink to limit its spread. In some embodiments, κ may be modulated with glue, which may form part of the formulation for permeability. In such embodiments, the modulation of viscosity with the relaxation parameter ω may be used for adjusting the viscosity globally. For example, in one embodiment, ω=0.5 normally, and may reach 1.5 for simulations of more fluent flow.

Figure 5:
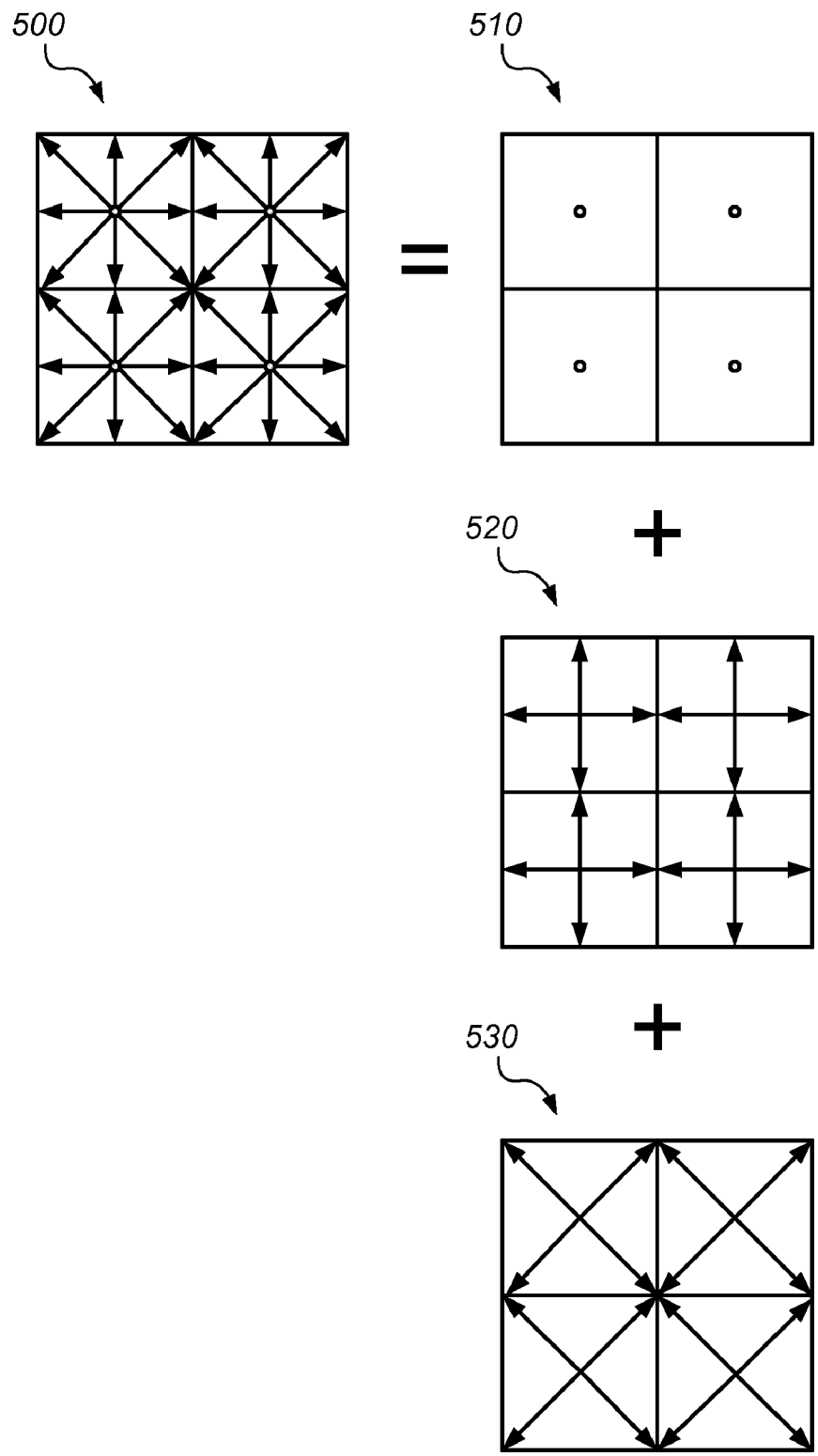
FIG. 5 illustrates a square lattice model for use in lattice Boltzmann equation based simulations, according to one embodiment.

In one embodiment, a Lattice Boltzmann (LBM) simulation may be adopted for the stable flow simulation. For a description of the Lattice Boltzman Model (LBM), see Xiaoyi He and Li-Shi Luo, "Lattice Boltzmann Model for the Incompressible Navier-Stokes Equation," Journal of Statistical Physics, Vol. 88, Number 3-4, P. 927-944, August 1997, which is herein incorporated by reference in its entirety. In various embodiments, the LBE approach may be used to model fluid dynamics using a simplified particle kinetic model. As described in Chu et al, this approach may divide the simulation domain into a regular lattice. At each lattice site x and time t, the fluid particles moving at arbitrary velocities may be modeled by a small set of particle distribution functions $f_i(x, t)$, each of which is the expected number of particles moving along a lattice vector $e_i$. In some embodiments, a standard square lattice model, called D2Q9, may be used to model 2D flow. This model is illustrated in FIG. 5 as element 500. In the illustrated embodiment, nine bins (four horizontal-vertical bins, four diagonal bins, and one stational bin) may be used to store the portions of fluid that are moving in the corresponding directions. As illustrated in FIG. 5, there are nine corresponding lattice vectors associated with each lattice site: four pointing to the four nearest neighbor sites (as illustrated by 520), four pointing along the diagonals to the next nearest sites (as illustrated by 530), and a zero vector corresponding to the stationary particles (as illustrated by 510). In one embodiment, to compute the next iteration of the flow simulation, there are two steps, streaming and collision. The streaming action may be used to sample how much fluid is flowing into the current lattice site. Based on the flowing-in fluid, the equilibrium state of the site may be obtained. The relaxed fluid state may then be computed in the collision stage. During each time step Δt, two operations are performed at each lattice site: (1) streaming $f_i$'s to the next lattice site along their directions of motion, and (2) colliding $f_i$'s that arrive at the same site. The collision redistributes $f_i$'s toward their equilibrium distribution functions $f_i^{(eq)}$. The two operations of streaming and collision may be mathematically described by the LBE as follows:

$$f_i(x+e_i\Delta t, t+\Delta t) = (1-\omega)f_i(x,t) + \omega f_i^{(eq)}(x,t) \quad (3)$$

where $\omega$ is the relaxation parameter. There are numerous variants of the LBE flow model. In some embodiments, the 'incompressible' variant, which can minimize the compressible effect inherent in the LBE, may be employed, as described in Chu et al. In this model, the equilibrium distributions $f_i^{(eq)}$ are as follows:

$$f_i^{(eq)} = w_i\left\{\rho + \rho_0\left[\frac{3}{c^2}e_i \cdot u + \frac{9}{2c^4}(e_i \cdot u)^2 - \frac{3}{2c^2}u \cdot u\right]\right\} \quad (4)$$

where c equals $\Delta x/\Delta t$, $\Delta x$ is the lattice spacing, $w_i$ are constants determined by the lattice geometry, $\rho$ and u are fluid density and velocity, respectively, and $\rho_0$ is a predefined average fluid density. In some embodiments, an initial configuration used in the simulation may set $\Delta x=\Delta t=c=\rho_0=1$. In such embodiments, the constants $w_i$ may be set as 4/9 for i=0, 1/9 for i=1, 2, 3, 4, and 1/36 for i=5, 6, 7, 8. Fluid density and velocity at each site may then be given by $$\rho = \sum_{i=0}^{8} f_i, \quad (5)$$

$$u = \frac{1}{\rho_0}\sum_{i=1}^{8} e_i f_i \quad (6)$$

In this example, equation 4 represents an equilibrium state computation, where e and u are sampled in the streaming stage; equation 3 represents a relaxed fluid state computation; and equations 5 and 6 represent total density and velocity calculations, respectively.

As described in Chu et al, to avoid the unphysical situation of negative density, the basic LBE may in some embodiments be modified to reduce the strength of the advection when the density is low, e.g., by adding a weight $\psi$ to the terms responsible for advection:

$$f_i^{(eq)} = w_i\left\{\rho + \rho_0\psi\left[\frac{3}{c^2}e_i \cdot u + \frac{9}{2c^4}(e_i \cdot u)^2 - \frac{3}{2c^2}u \cdot u\right]\right\} \quad (7)$$

$$\psi = \text{smoothstep}(0, \alpha, \rho) \quad (8)$$

where $\alpha$ is a user parameter for adjusting this effect. For example, in some embodiments, the range $0.2 \leq \alpha \leq 0.5$ works well in watercolor painting simulations.

As described in Chu et al, various rules to model pining and de-pinning may be efficiently integrated into the LBE. For example, a lattice site may be referred to as a pinning site if it is dry and the water density $\rho$ at each of its eight neighbors is below a given threshold. In one embodiment, the four nearest neighbors may share the same threshold, denoted by $\sigma$, and the threshold for the four next nearest neighbors may be set to $\sqrt{2}\sigma$ to compensate for geometric difference of the links. To effect the pinning, the blocking factor $\kappa$ may be overwritten at all the pinning sites by a large value to fully block all their neighbor links.

As described above and in Chu et al, in some embodiments, the paper texture includes a pinning texture, which may be used to model the effect of paper disorder. Modulating the threshold $\sigma$ with this texture may represent the effect of paper that exhibits easier ink flow at certain locations and in certain directions.

As described in Chu et al, the movement of pigments can be divided into three parts: supply, advection, and fixture. As noted above, the ink deposited on the surface layer may serve as a reservoir that provides ink supply to the flow layer. After determining the amount of water supplied from the surface, $\phi$, the pigment in the flow layer may be updated according to the ratio of $\rho$ to $\phi$ as: $pf \leftarrow (p_f\rho + p_s\phi)/(\rho+\phi)$, where $p_f$ and $p_s$ denote the pigment concentrations in the flow layer and the surface layer, respectively, and pf denotes the array of concentrations at a site.

In one embodiment, the color and pigment concentration of the flow layer may be obtained using different equations following the LBM simulation. In other words, the advection operation may distinguish between sites that are already wet from those that are becoming wet in the current time step. For a site that is already wet, the following equation may be used:

$$p^*_f(x) = p_f(y), \text{ where } y = x - u(x) \quad (9)$$

For a site that is becoming wet, this equation may be used:

$$p^*_f(x) = \frac{1}{\rho}\sum_{i=1}^{8} f_i p_f(x - e_i) \quad (10)$$

The evaporation stage may be used to determine how much water is to evaporate so that the corresponding pigment of the flow layer may be deposited onto the fixture layer. For pinned sites, which have very high blocking parameters, the evaporation process may be somewhat faster. The evaporation rate may be arbitrarily controlled uniformly, or may be controlled by a B channel of the paper texture, as described herein.

As described in Chu et al, in embodiments employing the three layer model described herein, pigments in the flow layer are gradually transferred to the fixture layer as the ink dries. In some embodiments, a pigment fixture algorithm (such as that described in Chu et al) may satisfy the following conditions: (1) the transfer rate is higher when the strokes become drier, (2) the transfer rate is higher when the glue is more concentrated, and (3) all pigments are settled when a stroke dries.

As previously noted, in some embodiments, front-to-back alpha blending may be used for compositing all three color layers to generate the final image. In such embodiments, alpha values for surface and flow layers may be obtained by evaluating the amount of pigments, or the product of Water·PC.

The watercolor simulation pipeline described above may be implemented within a graphics editing program (e.g., Adobe Photoshop®, etc.) framework. Various aspects may be implemented by program instructions executing on one or more central processor units (CPU), one or more graphics processing units (GPU), or a combination thereof. See Wei Li, Zhe Fan, Xiaoming Wei, and Arie Kaufman, "GPU-Based Flow Simulation with Complex Boundaries," GPU Gems II, Chapter 47, edited by Matt Pharr (NVIDIA) and published by Addison Wesley, which is herein incorporated by reference in its entirety. In some embodiments, a texture layer for a 3D postcard (i.e. a flow layer) may be provided for the simulation purpose.

Figure 6:
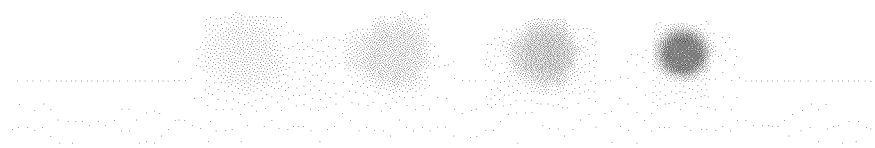
FIGS. 6-9 illustrate various graphical images containing watercolor painting effects, according to one embodiment.
Figure 7:
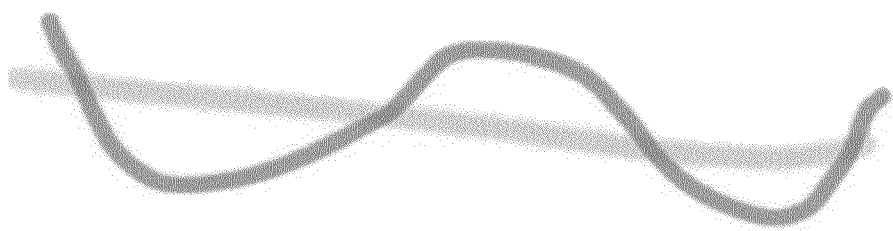

FIGS. 6-9 illustrate various watercolor painting effects that may be produced using the system and methods described herein, according to various embodiments. For example FIG. 6 illustrates a comparison of the flow results for the deposition of ink using different pigment concentration parameters, but the same ink amount. In one embodiment, two slider controls may be provided in the graphics editing program user interface for ink amount and pigment concentration control. FIG. 6 illustrates (from left to right) ink deposition with pigment concentrations of 25%, 50%, 75% and 100%, respectively, but with the same amount of ink. FIG. 7 illustrates two watercolor strokes simulated in the graphics editing program, according to one embodiment. In this example, the paths of the two strokes cross each other, and the ink represented by the curved line essentially covers the ink represented by the straight line at their points of intersection. In other examples, the ink represented by two overlapping or crossing lines may be mixed at their points of intersection.

Figure 8:

FIG. 8 illustrates how brushes may be applied directly onto the flow layer for watercolor painting via a brush tool interface of the graphics editing program, according to one embodiment. In this example, various shapes have been painted using different colors and/or pigment concentrations.

FIG. 9 illustrates how ink flows during painting in the user interface of the graphics editing program, according to one embodiment. The example illustrated in FIG. 9 includes elements illustrated in FIGS. 7 and 8, as well as an example of how transparency may be considered for the simulation so that layer operations may be applied. For example, the two crossing lines at the bottom of FIG. 9 illustrate the effect of applying lines using transparent ink on top of each other. An additional element illustrated in FIG. 9 depicts an example of an image generated with a wax painting mask specified by modifying the absorption channel for the paper texture. In this example, the word "Adobe" at the bottom of FIG. 9 is created with an absorption channel value of zero. Therefore, the lines painted over the word flow past the word and are absorbed in other parts of the image.

Note that while FIGS. 6-9 illustrate various image examples in grey scale, the watercolor effect would typically be implemented in color. For example, all of the dots in FIG. 6 may be red, one line in FIG. 7 may be red while the other line may be purple, the star in FIG. 8 may be yellow while the other patterns may be blue, green, etc., and so forth.

Figure 10:
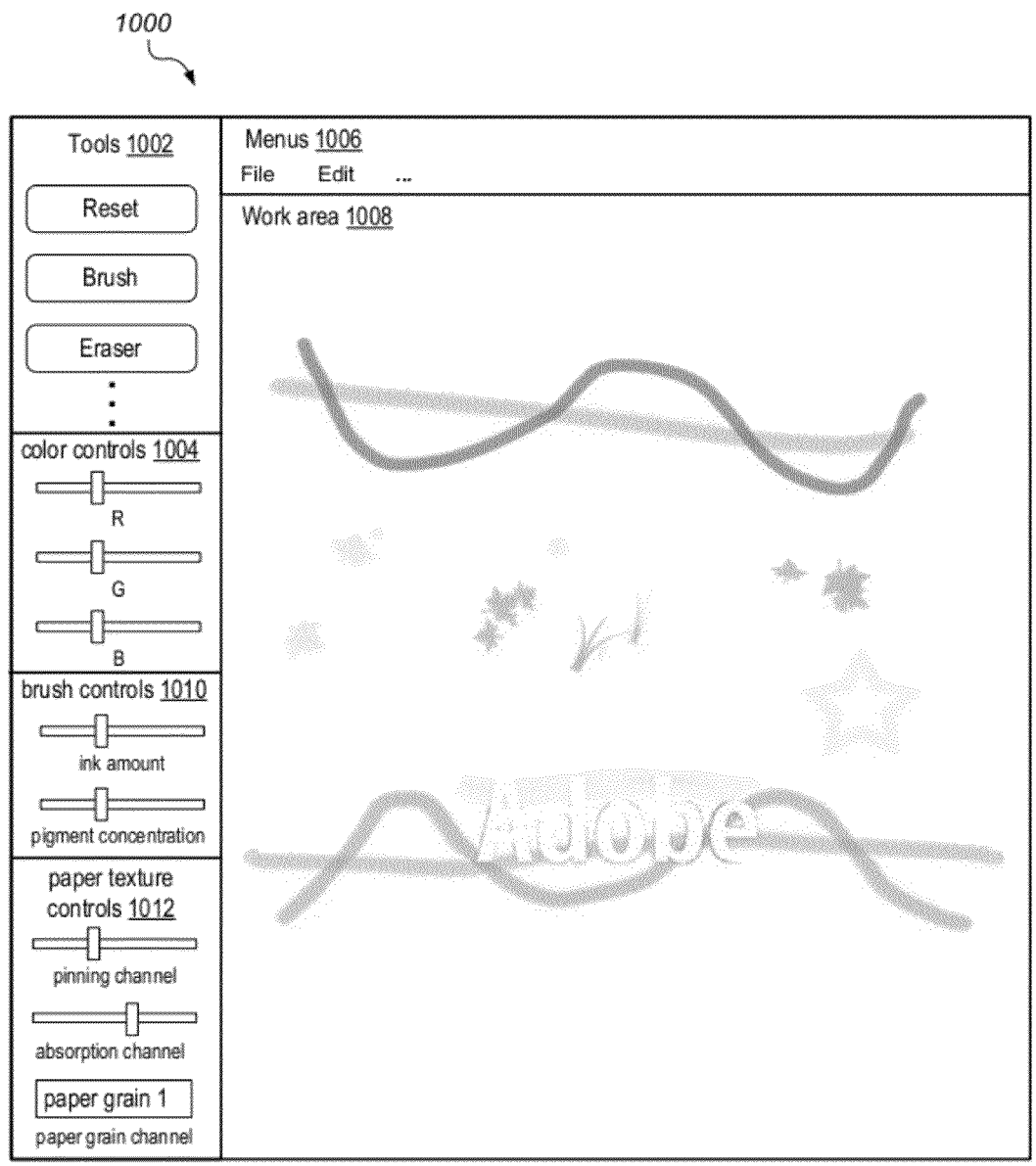
FIG. 10 illustrates a graphical user interface for a graphics editing application configured to simulate of watercolor painting effects, according to one embodiment.

FIG. 10 illustrates one embodiment of a user interface of a graphics editing program supporting watercolor painting effects as described herein. In this example, a graphics application that implements a graphics editing module including a brush tool may provide a user interface including one or more user interface elements whereby a user may select and control the use of the brush to simulate various watercolor painting effects, as described herein. The user interface to the graphics editing module may provide other user interface elements for controlling various aspects of graphics editing operations and/or for performing other graphics-related tasks. FIG. 10 illustrates a user interface for a graphics editing module, according to one embodiment. The user interface illustrated in FIG. 10 is provided as an example of one possible implementation, and is not intended to be limiting.

FIG. 10 illustrates an example display 1000 on which a user interface to a graphics editing module may be implemented, according to one embodiment. In this example, the display is divided into six regions or areas: menus 1006, tools 1002, color controls 1004, brush controls 1010, paper texture controls 1012, and work area 1008. Tools 1002 may include one or more user-selectable user interface elements. In this example, it is this area that contains the user interface elements that a user may select to apply various effects to the image. For example, the user may select a brush tool for use in applying a watercolor painting effect to an image being created and/or edited in work area 1008. Other optional tools may be selected as well, such as an eraser or reset function, which will be explained below. While FIG. 10 shows the elements in tools 1002 as buttons, other types of user interface elements, such as pop-up menus, may be used to select from among one or more tools in various embodiments. As noted above, the reset and eraser tools are optional, and thus may or may not be included on the user interface in various embodiments. Various embodiments may include other tools not shown as well, such as an "undo" tool that undoes the most recent user action in the work area 1008.

In this example, color controls 1004 may include one or more user-modifiable controls, such as slider bars, dials, pop-up menus, alphanumeric text entry boxes, etc., for specifying the hue and/or intensity of the ink to be applied to an image (e.g., using the brush tool). In this example, three slider bars are provided to specify an ink color. These three slider bars correspond to Red, Green, and Blue color channels, respectively. Similarly, brush controls 1010 may include one or more user-modifiable controls for specifying values (or relative values) of other configurable parameters related to the brush tool. In this example, two slider bars are provided that may be used to specify an amount of ink, and a pigment concentration amount, respectively, that are to be applied when using the brush tool to "paint" on the image being created or edited in work area 1008. As illustrated in the example in FIG. 10, paper texture controls 1012 may include one or more user-modifiable controls for specifying values (or relative values) of various paper texture parameters. In this example, two slider bars are provided for specifying a pinning parameter value and an absorption channel value, respectively. In this example, a box labeled "paper grain channel" may be used to select from among multiple pre-defined paper grain textures that may be available to the user (e.g. representing various paper/canvas types). Various methods of selecting a paper grain texture, or of specifying values of any of the other parameters used in simulating watercolor painting effects (i.e. methods other than those illustrated in FIG. 10) may be used in other embodiments.

In the example illustrated in FIG. 10, menus 1006 may include one or more menus, for example menus used to navigate to other displays in the graphics application, open files, print or save files, undo/redo actions, and so on. In this example, work area 1008 is the area in which an image being created or edited is displayed as graphics editing operations are performed. In various embodiments, work area 1008 may display a portion or all of a new image to which a watercolor painting effect is to be added, or a portion or all of a previously existing image being modified by adding a watercolor painting effect, as described herein. Work area 1008 of FIG. 10 illustrates an image in progress that includes watercolor painting effects similar to those illustrated in FIG. 9 and described above.

In one or more embodiments, various data structures may be used to store image data, parameter values, and/or configuration data used by the graphics editing application. For example, in one embodiment, data used in simulating watercolor painting effects may be packed for more efficient memory usage. FIG. 11 illustrates data packing for textures (e.g., for use in watercolor simulations in a graphics editing program), according to one embodiment. In this example, the data that may be packed together includes values related to the surface, flow, and fixture layers of the image model described herein (shown as A.1); the various bins used in the LBM simulations described herein (shown as A.2); various water tracking textures (shown as A.3); and the paper textures described herein (shown as A.3).

Figure 12:
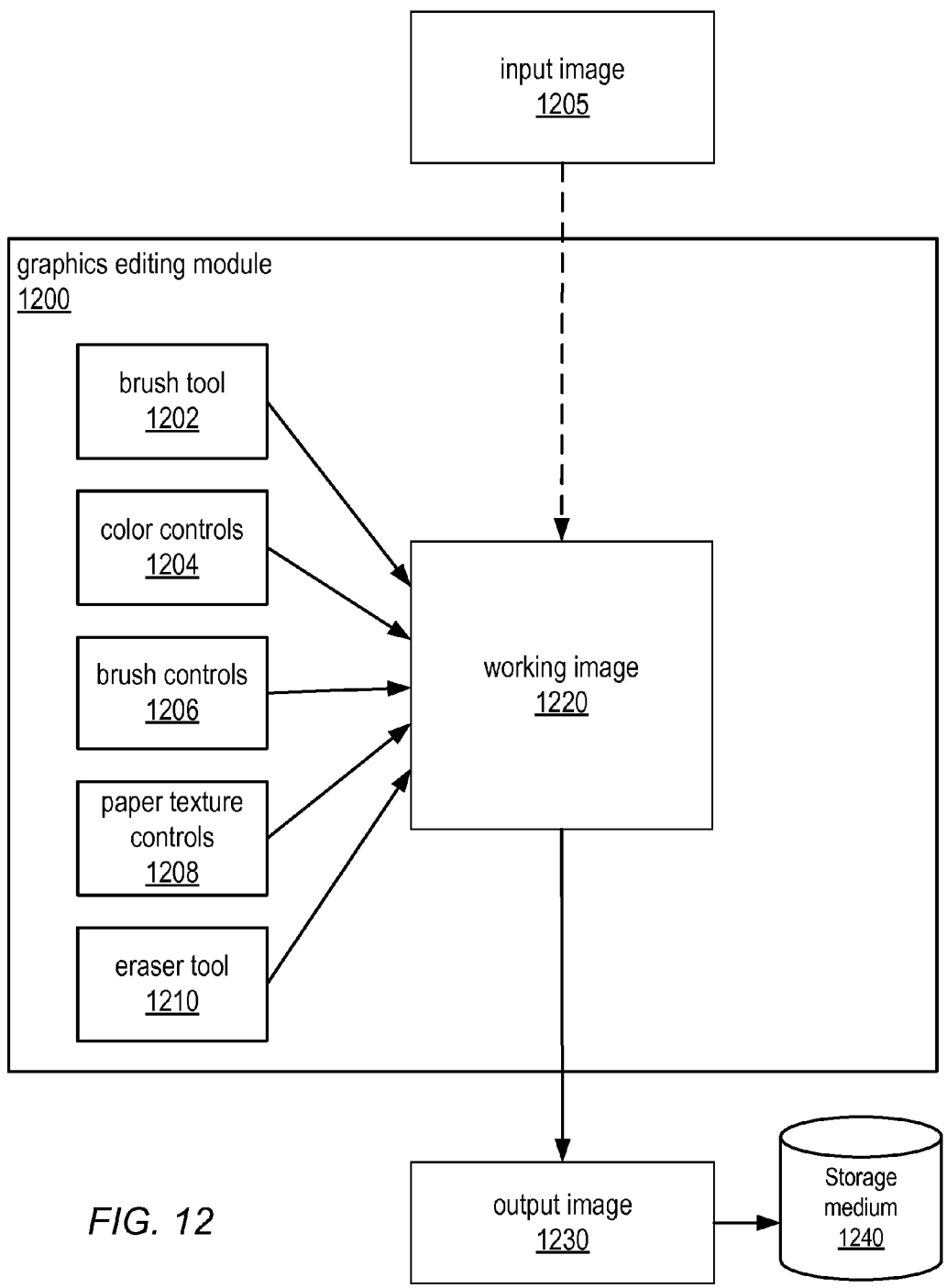
FIG. 12 illustrates various components of a graphics editing module, according to one embodiment.

FIG. 12 illustrates a graphics editing module, according to one embodiment. As illustrated in FIG. 12, graphics editing module 1200 may receive an input image 1205 to be used as the working image 1220. Alternatively, graphics editing module 1200 may be used to generate a new image as working image 1220. In this example, brush tool 1202 may be used to interactively generate a watercolor painting effect on working image 1220 under user control, as described above. In one embodiment, an optional eraser tool 1210 may be used to interactively erase parts of working image 1220 under user control. As described above, graphics editing module 1200 may include mechanisms for controlling the color of the ink depositing on working image 1220 (e.g., color controls 1204), for controlling the amount and/or concentration of pigment and water in the ink (e.g., brush controls 1206), and for controlling various paper texture parameters in the watercolor painting simulation (e.g., paper texture controls 1208). In this example, once the user has completed one or more graphics editing operations, the graphics editing module may display an updated working image 1220 reflecting those operations. In some embodiments, the user may select a "save" "file" or "print" operation (e.g., from menus 106 of FIG. 10) to produce and/or store an output image 1230 reflecting the watercolor painting effects produced by graphics editing module 1200. Output image 1230 may, for example, be stored to a local or network storage medium 1240, such as system memory, a local or network disk drive or other storage system, DVD, CD, etc.

Figure 13:
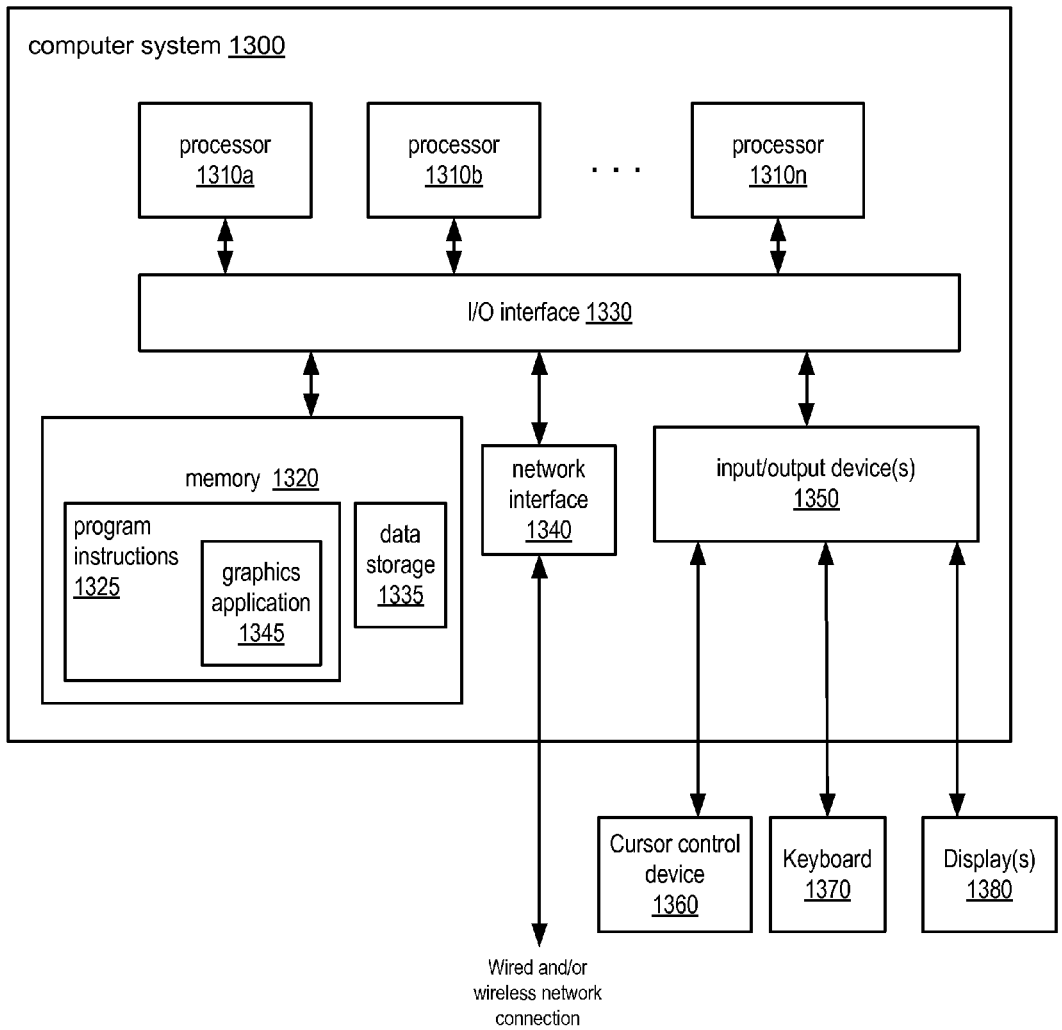
FIG. 13 illustrates a computer system configured to implement a graphics application that performs simulation of watercolor painting effects, according to one embodiment.

The techniques described herein for simulating watercolor painting effects (e.g., within a graphics editing application or any other type of computer program) may be implemented by a computer system configured to provide the functionality described. For example, a graphics editing program or application such as graphics application may be configured to perform watercolor painting effects as part of various editing functions and to render new images according to the effects. Various components of embodiments of a graphics editing module may be executed on one or more computer systems, which may interact with various other devices. One such computer system is illustrated by FIG. 13. In the illustrated embodiment, computer system 1300 includes one or more processors 1310 coupled to a system memory 1320 via an input/output (I/O) interface 1330. Computer system 1300 further includes a network interface 1340 coupled to I/O interface 1330, and one or more input/output devices 1350, such as cursor control device 1360, keyboard 1370, and display(s) 1380. Computer system 1300 may in some embodiments include other I/O devices not shown, such as a pen tablet. In some embodiments, it is contemplated that embodiments may be implemented using a single instance of computer system 1300, while in other embodiments multiple such systems, or multiple nodes making up computer system 1300, may be configured to host different portions or instances of embodiments. For example, in one embodiment some elements may be implemented via one or more nodes of computer system 1300 that are distinct from those nodes implementing other elements.

In various embodiments, computer system 1300 may be a uniprocessor system including one processor 1310, or a multiprocessor system including several processors 1310 (e.g., two, four, eight, or another suitable number). Processors 1310 may be any suitable processor capable of executing instructions. For example, in various embodiments, processors 1310 may be general-purpose or embedded processors implementing any of a variety of instruction set architectures (ISAs), such as an x86-compatible architecture from Intel Corporation or Advanced Micro Devices, or a processor implementing the PowerPC, SPARC™, or MIPS ISAs, or any other architecture or chipset capable of processing data, and may in various embodiments include multiple processors, a single threaded processor, a multi-threaded processor, a multi-core processor, or any other type of general-purpose or special-purpose processor. In multiprocessor systems, each of processors 1310 may commonly, but not necessarily, implement the same ISA. Any desired operating system(s) may be run on computer system 1600, such as various versions of Unix, Linux, Windows™ from Microsoft Corporation, MacOS™ from Apple Corporation, or any other operating system that enables the operation of software on a hardware platform.

In some embodiments, at least one processor 1310 may be a graphics processing unit. A graphics processing unit or GPU may be considered a dedicated graphics-rendering device for a personal computer, workstation, game console or other computer system. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods disclosed herein for simulating watercolor painting effects in a graphics application may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 1320 may be configured to store program instructions and/or data accessible by processor 1310. In various embodiments, system memory 1320 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for a graphics editing module implementing methods for simulating watercolor painting effects, are shown stored within system memory 1320 as program instructions 1325 and data storage 1335, respectively. In other embodiments, program instructions and/or data may be received, sent or stored upon different types of computer-accessible media or on similar media separate from system memory 1320 or computer system 1300. Generally speaking, a computer-accessible medium may include storage media or memory media such as magnetic or optical media, e.g., disk or CD/DVD-ROM coupled to computer system 1300 via I/O interface 1330. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1340.

In one embodiment, I/O interface 1330 may be configured to coordinate I/O traffic between processor 1310, system memory 1320, and any peripheral devices in the device, including network interface 1340 or other peripheral interfaces, such as input/output devices 1350. In some embodiments, I/O interface 1330 may perform any necessary protocol, timing or other data transformations to convert data signals from one component (e.g., system memory 1320) into a format suitable for use by another component (e.g., processor 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. In addition, in some embodiments some or all of the functionality of I/O interface 1330, such as an interface to system memory 1320, may be incorporated directly into processor 1310.

Network interface 1340 may be configured to allow data to be exchanged between computer system 1300 and other devices attached to a network, such as other computer systems, or between nodes of computer system 1300. In various embodiments, network interface 1340 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol. Network interface 1340 may use standard communications technologies and/or protocols, and may utilize links using technologies such as Ethernet, 802.11, integrated services digital network (ISDN), digital subscriber line (DSL), and asynchronous transfer mode (ATM) as well as other communications technologies. Similarly, the networking protocols used on a network to which computer system 1340 is interconnected may include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP), among other network protocols. The data exchanged over such a network by network interface 1340 may be represented using technologies, languages, and/or formats, such as the hypertext markup language (HTML), the extensible markup language (XML), and the simple object access protocol (SOAP) among other data representation technologies. Additionally, all or some of the links or data may be encrypted using any suitable encryption technologies, such as the secure sockets layer (SSL), Secure HTTP and/or virtual private networks (VPNs), the international data encryption standard (DES or IDEA), triple DES, Blowfish, RC2, RC4, RC5, RC6, as well as other data encryption standards and protocols. In other embodiments, custom and/or dedicated data communications, representation, and encryption technologies and/or protocols may be used instead of, or in addition to, the particular ones described above.

Input/output devices 1350 may, in some embodiments, include one or more display terminals, keyboards, keypads, touchpads, pen tablets, scanning devices, voice or optical recognition devices, or any other devices suitable for entering or retrieving data by one or more computer system 1300. Multiple input/output devices 1350 may be present in computer system 1300 or may be distributed on various nodes of computer system 1300. In some embodiments, similar input/output devices may be separate from computer system 1300 and may interact with one or more nodes of computer system 1300 through a wired or wireless connection, such as over network interface 1340.

As shown in FIG. 13, memory 1320 may include program instructions 1325, configured to implement embodiments of a graphics editing module and/or of one or more methods of providing support for interactively adding watercolor painting effects to an image as described herein, and data storage 1335, comprising various data accessible by program instructions 1325, for example one or more files containing scripts that implement one or more graphics editing operations. In one embodiment, program instructions 1325 may include software elements of a graphics editing module, which may be a module of a graphics application 1345. Data storage 1335 may include other data that may be used in various embodiments, for example one or more files containing input images, intermediate images, or output images; configuration data (e.g., values of color control parameters, brush control parameters, paper texture control parameters, etc.). In other embodiments, other or different software elements and/or data may be included in system memory 1320.

Those skilled in the art will appreciate that computer system 1300 is merely illustrative and is not intended to limit the scope of a graphics editing module supporting watercolor painting effects as described herein. In particular, the computer system and devices may include any combination of hardware or software that can perform the indicated functions, including computers, network devices, internet appliances, PDAs, wireless phones, pagers, etc. Computer system 1300 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1300 may be transmitted to computer system 1300 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, other embodiments may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., volatile or non-volatile media such as RAM (e.g. SDRAM, DDR, RDRAM, SRAM, etc.), ROM, etc., (e.g., CD-ROMs, CD-RW drives, DVD-ROMs, DVD-RW drives), flash memory devices, holographic storage, etc. In other embodiments, a computer-accessible medium may include transmission media or signals such as electrical, electromagnetic, or digital signals, conveyed via a communication medium such as network and/or a wireless link.

Graphics application 1345 may represent various types of graphics applications, such as painting, publishing, photography, games, animation, and other applications. Additionally, graphics application 1345 may utilize one or more of processors 1310 (e.g., one or more general purpose processors or graphics processors) when rendering or displaying images according to various embodiments. Functionality and/or features described herein as being part of, or performed by, graphics application 1345 or a graphics editing thereof may, in some embodiments, be part of, or performed by, one or more graphics processors.

Watercolor painting effects, as described herein, may be implemented on various types of computer systems. For example, computer system 1300 may be any of various types of devices, including, but not limited to, a personal computer system, desktop computer, laptop or notebook computer, mainframe computer system, handheld computer, workstation, network computer, a consumer device, video game console, handheld video game device, application server, storage device, a peripheral device such as a switch, modem, router, or in general any type of computing device.

Graphics application 1345, which may be configured to implement the techniques described herein, may be provided as a computer program product, or software, that may include a computer-readable storage medium having stored thereon instructions, which may be used to program computer system 1300 (or other electronic devices) to implement watercolor painting effects, as described herein. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, or other types of signals or mediums.).

Program instructions 1325 may also be stored on an external storage device (not shown) accessible by the processor(s) 1310, in some embodiments. Any of a variety of such storage devices may be used to store the program instructions 1325 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. Program instructions 1325 (including graphics application 1345) may be implemented in various embodiments using any desired programming language, scripting language, or combination of programming languages and/or scripting languages, e.g., C, C++, C#, Java™, Perl, etc. For example, in one embodiment, graphics application 1345 may be JAVA based, while in another embodiments, it may be implemented using the C or C++ programming languages. In other embodiments, graphics application 1345 may be implemented using specific graphic languages specifically for developing programs executed by specialize graphics hardware, such as a GPU. For example, graphics application 1345 may be implemented using Cg (from NVIDIA Corporation), OpenGL Shading Language (GLSL), High Level Shading Language for DirectX (HLSL) (from Microsoft Corporation), or Renderman® (from Pixar), in various embodiments. In addition, graphics application 1345 may be embodied on memory specifically allocated for use by one or more graphics processor(s), such as memory on a graphics board including one or more graphics processor(s). Thus, memory 1320 may represent dedicated graphics memory as well as general-purpose system RAM, in various embodiments.

It will be apparent to those having ordinary skill in the art that computer system 1300 may also include numerous other elements not shown in FIG. 13.

While various techniques have been described herein with reference to various embodiments, it will be understood that these embodiments are illustrative and are not meant to be limiting. Many variations, modifications, additions, and improvements are possible. More generally, various techniques are described in the context of particular embodiments. For example, the blocks and logic units identified in the description are for ease of understanding and are not meant to be limiting to any particular embodiment. Functionality may be separated or combined in blocks differently in various realizations or described with different terminology. In various embodiments, actions or functions described herein may be performed in a different order than illustrated or described. Any of the operations described may be performed programmatically (i.e., by a computer according to a computer program). Any of the operations described may be performed automatically (i.e., without user intervention).

The embodiments described herein are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the illustrated configurations may be implemented as a combined structure or component. These and other variations, modifications, additions, and improvements may fall within the scope as defined in the claims that follow.

Although the embodiments above have been described in detail, numerous variations and modifications will become apparent to those skilled in the art once the above disclosure is fully appreciated. It is intended that the description be interpreted to embrace all such variations and modifications.

What is claimed is:

1. A system, comprising:
   one or more processors; and
   a memory coupled to the one or more processors and storing program instructions executable by the one or more processors to implement:
   receiving input representing a deposition of ink on a paper characterized by a given paper texture, wherein the given paper texture characterizes the paper using a plurality of parameter channels, wherein one of the plurality of parameter channels is a dedicated absorption parameter channel that controls the absorption behavior of the paper in simulation operations;
   determining a blocking effect of the given paper texture on the deposition of ink, wherein the blocking effect is dependent on the dedicated absorption parameter channel of the given paper texture;
   simulating an effect of the deposition of ink on the paper, wherein the effect is dependent on the determined blocking effect; and displaying an image representing the effect of the deposition of ink on the paper, wherein said displaying is dependent on said simulating.

2. The system of claim 1,
wherein the input is received from a graphical user interface; and
wherein the input is provided using a brush tool of the graphical user interface.

3. The system of claim 1,
wherein the input represents a brush stoke of a watercolor painting.

4. The system of claim 1, wherein said displaying comprises compositing two or more image layers to generate the image.

5. The system of claim 1, wherein said simulating is performed with respect to a flow layer of a three layer ink dispersion model comprising: a surface layer, the flow layer, and a fixture layer.

6. The system of claim 5, wherein said displaying comprises performing a front-to-back layer composition on the three layer model.

7. The system of claim 1, wherein said simulating is based on a lattice Boltzmann method and comprises simulation of:
a stable flow;
a streaming action; and
a collision action.

8. The system of claim 1, wherein the program instructions are further executable to implement: simulating a wax masking effect in response to the deposition of ink, wherein the wax masking effect is dependent on the dedicated absorption parameter channel of the given paper texture.

9. The system of claim 1, wherein the program instructions are further executable to implement: simulating evaporation of water in response to the deposition of ink, wherein the evaporation is dependent on a value of a configurable water concentration parameter for the ink.

10. The system of claim 9, wherein the evaporation is further dependent on the dedicated absorption parameter channel of the given paper texture.

11. The system of claim 1, wherein the given paper texture further comprises a grain texture channel, and wherein the blocking effect is further dependent on the grain texture channel of the given paper texture.

12. The system of claim 1, wherein the given paper texture further comprises a pinning parameter channel, and wherein the blocking effect is further dependent on the pinning parameter channel of the given paper texture.

13. The system of claim 1, wherein the program instructions are further executable to implement: applying a noise texture to the dedicated absorption parameter channel to simulate variations in absorption across the paper.

14. A non-transitory, computer-readable storage medium, storing program instructions computer-executable to implement:
receiving input representing a deposition of ink on a paper characterized by a given paper texture, wherein the given paper texture characterizes the paper using a plurality of parameter channels, wherein one of the plurality of parameter channels is a dedicated absorption parameter channel that controls the absorption behavior of the paper in simulation operations;
determining a blocking effect of the given paper texture on the deposition of ink, wherein the blocking effect is dependent on the dedicated absorption parameter channel of the given paper texture;

simulating an effect of the deposition of ink on the paper, wherein the effect is dependent on the determined blocking effect; and
displaying an image representing the effect of the deposition of ink on the paper, wherein said displaying is dependent on said simulating.

15. The storage medium of claim 14,
wherein the input is received from a graphical user interface; and
wherein the input is provided using a brush tool of the graphical user interface.

16. The storage medium of claim 14, wherein said displaying comprises compositing two or more image layers to generate the image.

17. The storage medium of claim 14, wherein said simulating is performed with respect to a flow layer of a three layer ink dispersion model comprising: a surface layer, the flow layer, and a fixture layer.

18. The storage medium of claim 14, wherein said simulating is based on a lattice Boltzmann method and comprises simulation of:
a stable flow;
a streaming action; and
a collision action.

19. The storage medium of claim 14, wherein the program instructions are further computer-executable to implement: simulating a wax masking effect in response to the deposition of ink, wherein the wax masking effect is dependent on the dedicated absorption parameter channel of the given paper texture.

20. The storage medium of claim 14, wherein the program instructions are further computer-executable to implement: simulating evaporation of water in response to the deposition of ink, wherein the evaporation is dependent on a value of a configurable water concentration parameter for the ink or on the dedicated absorption parameter channel of the given paper texture.

21. The storage medium of claim 14, wherein the given paper texture further comprises a grain texture channel, and wherein the blocking effect is further dependent on the grain texture channel of the given paper texture.

22. The storage medium of claim 14, wherein the given paper texture further comprises a pinning parameter channel, and wherein the blocking effect is further dependent on the pinning parameter channel of the given paper texture.

23. The storage medium of claim 14, wherein the program instructions are further computer-executable to implement: applying a noise texture to the dedicated absorption parameter channel to simulate variations in absorption across the paper.

24. A computer-implemented method, comprising:
receiving input representing a deposition of ink on a paper characterized by a given paper texture, wherein the given paper texture characterizes the paper using a plurality of parameter channels, wherein one of the plurality of parameter channels is a dedicated absorption parameter channel that controls the absorption behavior of the paper in simulation operations;
determining a blocking effect of the given paper texture on the deposition of ink, wherein the blocking effect is dependent on the dedicated absorption parameter channel of the given paper texture;
simulating an effect of the deposition of ink on the paper, wherein the effect is dependent on the determined blocking effect; and displaying an image representing the effect of the deposition of ink on the paper, wherein said displaying is dependent on said simulating.

25. The method of claim 24,
wherein the input is received from a graphical user interface; and
wherein the input is provided using a brush tool of the graphical user interface.

26. The method of claim 24, wherein said displaying comprises compositing two or more image layers to generate the image.

27. The method of claim 24, wherein said simulating is performed with respect to a flow layer of a three layer model comprising: a surface layer, the flow layer, and a fixture layer.

28. The method of claim 24, wherein said simulating is based on a lattice Boltzmann method and comprises simulation of:
   a stable flow;
   a streaming action; and
   a collision action.

29. The method of claim 24, further comprising: simulating a wax masking effect in response to the deposition of ink, wherein the wax masking effect is dependent on the dedicated absorption parameter channel of the given paper texture.

30. The method of claim 24, further comprising: simulating evaporation of water in response to the deposition of ink, wherein the evaporation is dependent on a value of a configurable water concentration parameter for the ink or on the dedicated absorption parameter channel of the given paper texture.

31. The method of claim 24, wherein the given paper texture further comprises a grain texture channel, and wherein the blocking effect is further dependent on the grain texture channel of the given paper texture.

32. The method of claim 24, wherein the given paper texture further comprises a pinning parameter channel, and wherein the blocking effect is further dependent on the pinning parameter channel of the given paper texture.

33. The method of claim 24, wherein the program instructions are further computer-executable to implement: applying a noise texture to the dedicated absorption parameter channel to simulate variations in absorption across the paper.

34. A computer-implemented method, comprising:
   executing instructions on a specific apparatus so that binary digital electronic signals representing a deposition of ink on a paper characterized by a given paper texture are received, wherein the given paper texture characterizes the paper using a plurality of parameter channels, wherein one of the plurality of parameter channels is a dedicated absorption parameter channel that controls the absorption behavior of the paper in simulation operations; and
   in response to said receiving:
      executing instructions on said specific apparatus to determine a blocking effect of the given paper texture on the deposition of ink, wherein the blocking effect is dependent on the dedicated absorption parameter channel of the given paper texture;
      executing instructions on said specific apparatus to simulate an effect of the deposition of ink on the paper, wherein the effect is dependent on the determined blocking effect; and
      executing instructions on said specific apparatus to produce binary digital electronic signals representing an output image reflecting the effect of the deposition of ink on the paper, wherein the output image is dependent on said simulating; and
   storing the binary digital electronic signals representing the output image in a memory location of said specific apparatus.

\* \* \* \* \*